(12) United States Patent
Samson et al.

(10) Patent No.: US 8,781,641 B2
(45) Date of Patent: Jul. 15, 2014

(54) METHOD AND APPARATUS FOR EXTERNAL PROCESSOR THERMAL CONTROL

(75) Inventors: Eric C. Samson, Folsom, CA (US);
John William Horigan, Mountain View, CA (US); Robert T. Jackson, San Jose, VA (US); Ticky Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/980,648

(22) Filed: Dec. 29, 2010

(65) Prior Publication Data

US 2011/0090640 A1 Apr. 21, 2011

Related U.S. Application Data

(63) Continuation of application No. 11/027,433, filed on Dec. 29, 2004, now abandoned.

(51) Int. Cl.
*G05D 23/00* (2006.01)

(52) U.S. Cl.
USPC ............................... 700/300; 700/2; 700/121

(58) Field of Classification Search
USPC .............. 62/259.2, 203; 700/2, 121, 299, 300
See application file for complete search history.

(56) References Cited

U.S. PATENT DOCUMENTS

| | | | |
|---|---|---|---|
| 5,502,838 A | 3/1996 | Kikinis | |
| 5,990,461 A | 11/1999 | Stumpf et al. | |
| 6,173,217 B1 | 1/2001 | Bogin et al. | |
| 6,466,226 B1 | 10/2002 | Watson et al. | |
| 6,704,877 B2 | 3/2004 | Cline et al. | |
| 6,928,565 B2 | 8/2005 | Watts et al. | |
| 7,058,824 B2 | 6/2006 | Plante et al. | |
| 7,210,048 B2 | 4/2007 | Bodas | |
| 7,240,225 B2 | 7/2007 | Brewer et al. | |
| 2003/0177405 A1 | 9/2003 | Greiner et al. | |
| 2004/0148528 A1 | 7/2004 | Silvester | |
| 2005/0030171 A1* | 2/2005 | Liu et al. | 340/500 |

FOREIGN PATENT DOCUMENTS

| | | |
|---|---|---|
| DE | 10392126 | 7/2004 |
| TW | 376532 | 12/1999 |
| TW | 463097 | 11/2001 |
| TW | 200419326 A | 10/2004 |

(Continued)

OTHER PUBLICATIONS

International Preliminary Report on Patentability and Written Opinion received for PCT Patent Application No. PCT/US2005/047677, mailed on Jul. 12, 2007, 8 pages.

(Continued)

*Primary Examiner* — Carlos Ortiz Rodriguez
(74) *Attorney, Agent, or Firm* — Derek J. Reynolds (57) ABSTRACT

A system and method for throttling a slave component of a computer system to reduce an overall temperature of the computing system upon receiving a first signal is disclosed. The first signal may be from a master component indicating that a temperature for the master component has exceeded its threshold temperature. The slave component may send a second signal to indicate that a temperature for the slave component has exceeded its temperature. The master component would then initiate throttling of the master component to reduce the overall temperature of the computing system. The master component may be throttled to a degree less than the slave component. A first component may be designated the master component and the second component may be designated the slave component based on a selection policy.

10 Claims, 6 Drawing Sheets

(56) References Cited

FOREIGN PATENT DOCUMENTS

| | | | |
|---|---|---|---|
| WO | 01/22176 | A1 | 3/2001 |
| WO | 03/079170 | A2 | 9/2003 |
| WO | 2006/072097 | A2 | 7/2006 |
| WO | 2006/072097 | A3 | 9/2006 |

OTHER PUBLICATIONS

International Search Report received for PCT Patent Application No. PCT/US2005/047677, mailed on Feb. 8, 2006, 4 pages.

Mike Magee, "Intel moves to throttle throttle-bottle story", The Register, Mar. 23, 2001.

* cited by examiner

METHOD AND APPARATUS FOR EXTERNAL PROCESSOR THERMAL CONTROL

BACKGROUND OF THE INVENTION

Embodiments of the invention pertain to cooling systems for computer systems. More particularly, embodiments of the invention pertain to throttling a component of a computer system based on a criterion.

The movement of electrons within the electrical components of a computer system causes a great deal of heat to be generated. Unless the heat is dissipated, it will accumulate, causing damage to the system. Such damage may include the warping of the electrical components and possible fire hazards.

Currently, thermal sensors are attached to a die to read the actual temperature of the die hot spots. When the hot spot temperatures are exceeded on a particular die, that die reduces its temperature independently of the other die using some form of reduction in work per unit time, also called throttling. This throttling prevents a die from reaching its maximum working temperature and damaging the system. Throttling may be performed by clock gating and clock frequency reduction.

The throttling may be triggered if the thermal sensors read a throttling threshold temperature up to some maximum tolerable temperature. To ensure safety, this maximum temperature may be set well below a temperature that causes actual catastrophic damage.

Usually, different components in a system, such as the central unit and the graphics memory and controller hub (GMCH), may share a cooling system for a more efficient design to the computer system. However, these different components often have different cooling needs.

DETAILED DESCRIPTION

A system and method for throttling a slave component of a computer system to reduce an overall temperature of the computing system upon receiving a first signal is disclosed. The first signal may be from a master component indicating that a temperature for the master component has exceeded its threshold temperature. The slave component or the master component may be a central processing unit (CPU), a graphics memory and controller hub (GMCH), or a CPU memory controller hub. The slave component may send a second signal to indicate that a temperature for the slave component has exceeded its temperature. The master component may then initiate throttling of the master component to reduce the overall temperature of the computing system. The master component may be throttled to a degree less than the slave component. A first component may be designated the master component and the second component may be designated the slave component based on a selection policy. The selection policy may be received from a user through a graphical user interface. The selection policy may be based on an action being performed by the computing system.

Embodiments of the present invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, compact disk-read only memories (CD-ROMs), and magnetic-optical disks, read-only memories (ROMs), random access memories (ROMs), erasable programmable read only memories (EPROMs), electronically erasable programmable read only memories (EEPROMs), magnetic or optical cards, or any type of media suitable for storing electronic instructions, and each coupled to a computer system bus. Instructions are executable using one or more devices (e.g., central processing units, etc.). In other embodiments, steps of the present invention might be performed by specific hardware components that contain reconfigurable or hardwired logic for performing the steps, or by any combination of programmed computer components and custom hardware components.

Figure 1:
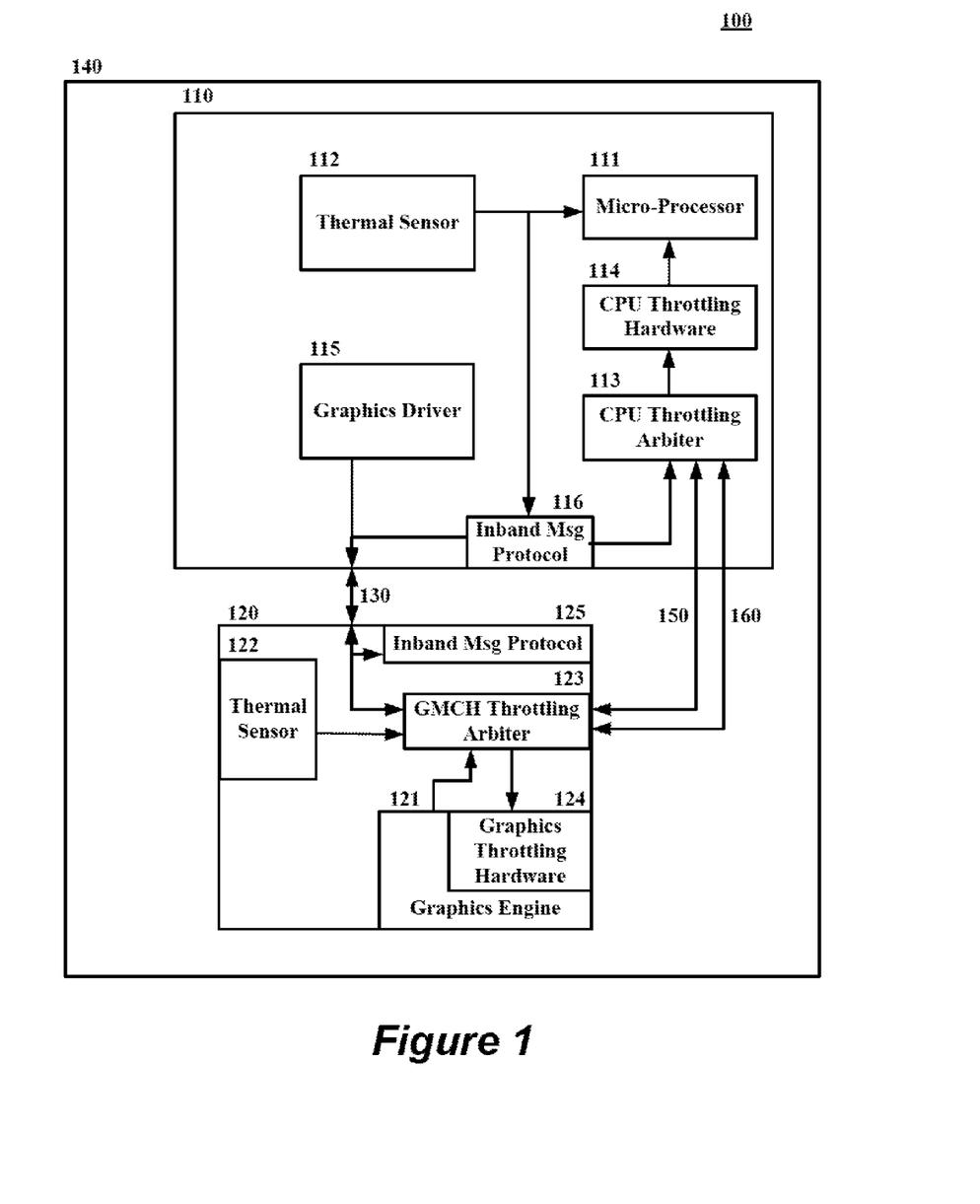
FIG. 1 illustrates one embodiment of a computing system according to the present invention.

FIG. 1 illustrates one embodiment of a computing system 100 according to the present invention. A first component, such as a CPU 110, may be coupled to a second component, such as a GMCH 120, by a front side bus (FSB) 130. While this description will refer specifically to a CPU and a GMCH, it is to be understood that other components may also be used. For example, the component may also be a CPU memory controller hub. The CPU 110 and the GMCH 120 share a cooling system 140. This cooling system 140 may take one of any number of forms known in the art, such as air circulation units, heat exchangers, or other methods. While the cooling system 140 should be able to handle the sum of the thermal design power (TDP) of both the CPU 110 and the GMCH 120 in most computing systems, in some computing systems this is not the case for various reasons. The TDP for a component is defined as the steady state power for which a thermal solution for that component should be designed so that the component will not exceed any reliability temperature threshold, and is generally quoted at a specific ambient temperature. The maximum power for the CPU 110 and GMCH 120 may be more than the TDP of each device. Since the maximum power is more than the TDP power, physical damage due to overheating may occur when operating beyond the TDP power for a sufficiently long time.

The minimum residual GMCH thermal power budget is the power available to the GMCH 120 when the CPU 110 is at its maximum operating power in steady state. The minimum residual CPU thermal power budget is the power available to the CPU 110 when the GMCH 120 is at its maximum operating power in steady state.

The CPU 110 has a microprocessor 111 to process software instructions. The CPU 110 may have a thermal sensor 112 to detect when the CPU 110 is getting too hot. The thermal sensor 112 may alert a CPU throttling arbiter 113, which may contain throttling control logic to control CPU throttling hardware 114. The throttling hardware 114 then reduces the amount of processing being performed by the microprocessor. For a computing system 100 that executes graphics, a graphics driver 115 may be used to interact with the GMCH 120 via the FSB 130. Messages may be transmitted via the FSB 130 using the inband message protocol 116.

The GMCH 120 may have a graphics engine 121 to execute graphics processing. The GMCH 120 may have a thermal sensor 122 to detect when the GMCH 120 is getting too hot. The thermal sensor 122 may alert a GMCH throttling arbiter 123, which may contain throttling control logic to control GMCH throttling hardware 124. The throttling hardware 114 then reduces the amount of graphics execution being performed by the microprocessor. Messages may be transmitted via the FSB 130 using the inband message protocol 125.

The CPU 110 may have a pin 150, such as a PROCHOT pin, which receives a signal from the GMCH 120. Upon receiving the signal, the CPU throttling arbiter 113 may cause the CPU throttling hardware 114 to throttle the microprocessor 111. Additionally, the GMCH 120 may also have a PROCHOT pin 160, which receives a signal from the CPU 110. Upon receiving the signal, the GMCH throttling arbiter 123 may cause the graphics throttling hardware 124 to throttle the graphics engine 121.

Figure 2:
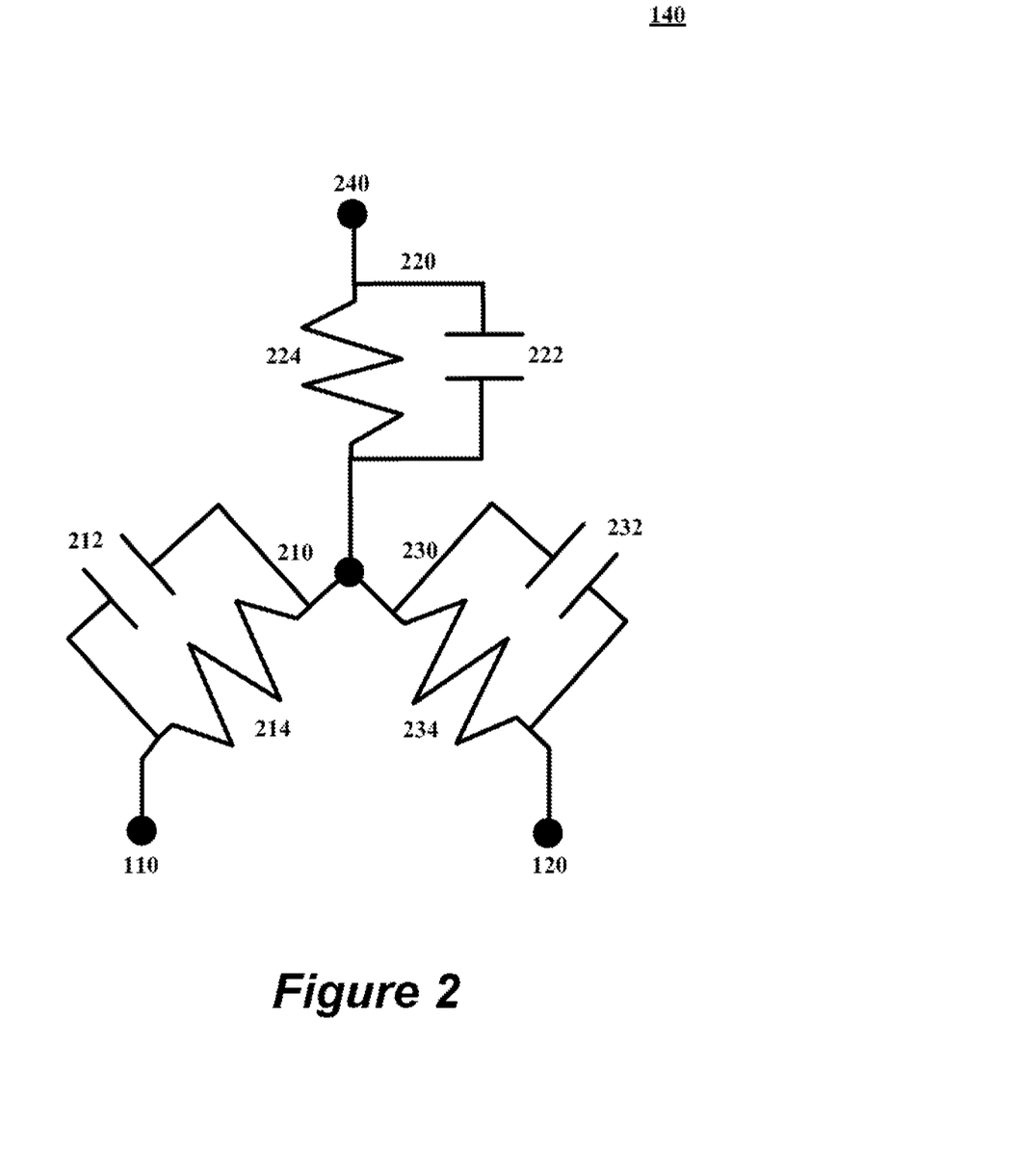
FIG. 2 illustrates in a diagram one embodiment of the shared cooling system according to the present invention.

FIG. 2 illustrates in a simplified diagram one embodiment of the shared cooling system 140. A first junction 210 may couple the CPU 110 to a shared thermal solution 220. The first junction 210 has a heat capacity 212 and a thermal conductivity 214 and the shared thermal solution 220 has a heat capacity 222 and a thermal conductivity 224. A second junction 230 may couple the CPU 110 to the shared thermal solution 220. The second junction 230 also has a heat capacity 232 and a thermal conductivity 234. The shared cooling system may reduce the entire system to the ambient temperature 240 of the surroundings.

The heat capacity 222 and the thermal conductivity 224 of the shared thermal solution 220 create a heat reduction factor $\theta_{sa}$. The heat capacity 212 and the thermal conductivity 214 of the first junction 210 create a heat reduction factor $\theta_{js1}$. The heat capacity 232 and the thermal conductivity 234 of the second junction 230 create a heat reduction factor $\theta_{js2}$. The temperature for the CPU 110 and the GMCH 120 may be governed by the equations:

$$T_{cpu} = (P_{cpu} + P_{gmch}) * \theta_{sa} + Ta + P_{cpu} * \theta_{js1}$$

$$T_{gmch} = (P_{cpu} + P_{gmch}) * \theta_{sa} + Ta + P_{gmch} * \theta_{js2}$$

where $P_{cpu}$ is the power from CPU 110, $P_{gmch}$ is the power from the GMCH 120, and Ta is the ambient temperature 240. If the temperature of the CPU 110 is greater than its maximum allowed die junction temperature, then the temperature of the CPU 110 must be reduced. If the temperature of the GMCH 120 is greater than its maximum allowed die junction temperature, then the temperature of the GMCH 120 must be reduced.

Figure 3:
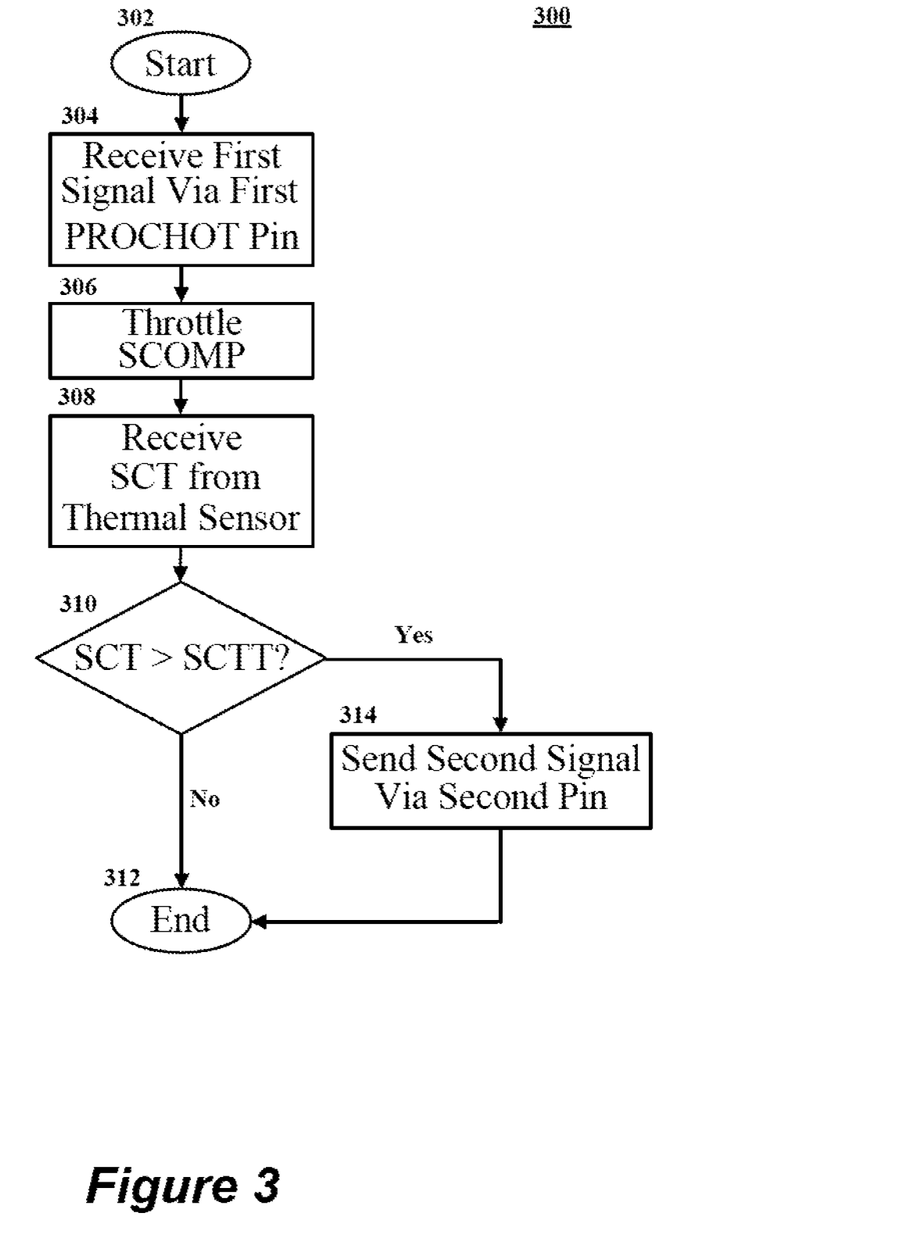
FIG. 3 illustrates in a flow chart one method for throttling a component to reduce the temperature by using a PROCHOT pin according to an embodiment of the present invention.

The temperatures of the CPU 110 and the GMCH 120 may be reduced in a number of ways. FIG. 3 illustrates in a flow chart one embodiment of a method 300 for throttling a component to reduce the temperature by using a PROCHOT pin. The process starts (Block 302) when a first component, designated the slave component (SCOMP), receives a first signal via the first PROCHOT pin from a second component, designated the master component (MCOMP) (Block 304). SCOMP and MCOMP may be either the CPU 110 or the GMCH 120, depending on the circumstances. Further, the CPU 110 or the GMCH 120 may be a master component at one moment and a slave component at the next moment. Additionally, the master-slave relationship of the components need not extend past the cooling situation described herein. MCOMP is indicating with the first signal that the temperature of MCOMP (MCT) has exceeded the threshold temperature of MCOMP (MCTT). The throttling arbiter then has the throttling hardware throttle the performance of SCOMP (Block 306). SCOMP may also receive a temperature reading of SCOMP (SCT) from its thermal sensor (Block 308). If SCT is not greater than the threshold temperature of SCOMP (SCTT) (Block 310), then the process ends (Block 312). If SCT is greater than SCTT (Block 310), then a second signal may optionally be sent to the PROCHOT pin of MCOMP (Block 314), ending the process (Block 312). This second signal indicates to the throttling arbiter of MCOMP to throttle MCOMP.

Figure 4:
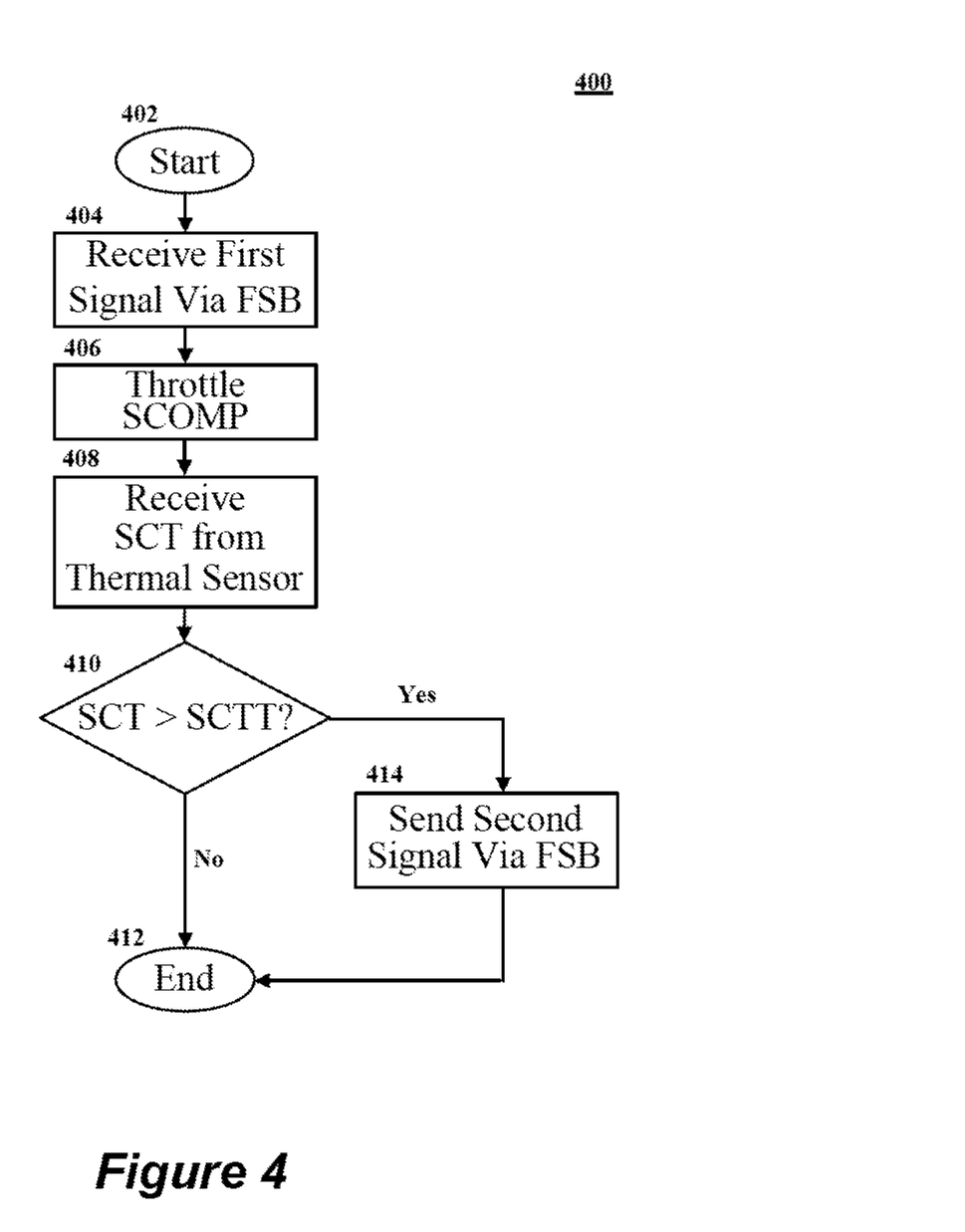
FIG. 4 illustrates in a flow chart one method for throttling a component to reduce the temperature by using the FSB according to an embodiment of the present invention.

FIG. 4 illustrates in a flow chart one embodiment of a method 400 for throttling a component to reduce the temperature by using the FSB 130. The process starts (Block 402) when SCOMP receives a first signal via the FSB from MCOMP (Block 404). Again, MCOMP is indicating with the first signal that MCT has exceeded MCTT. The throttling arbiter then has the throttling hardware throttle the performance of SCOMP (Block 406). SCOMP receives SCT from its thermal sensor (Block 408). If SCT is not greater than SCTT (Block 410), then the process ends (Block 412). If SCT is greater than SCTT (Block 410), then a second signal is sent to MCOMP via the FSB (Block 414), ending the process (Block 412). This second signal indicates to the throttling arbiter of MCOMP to throttle MCOMP.

Figure 5:
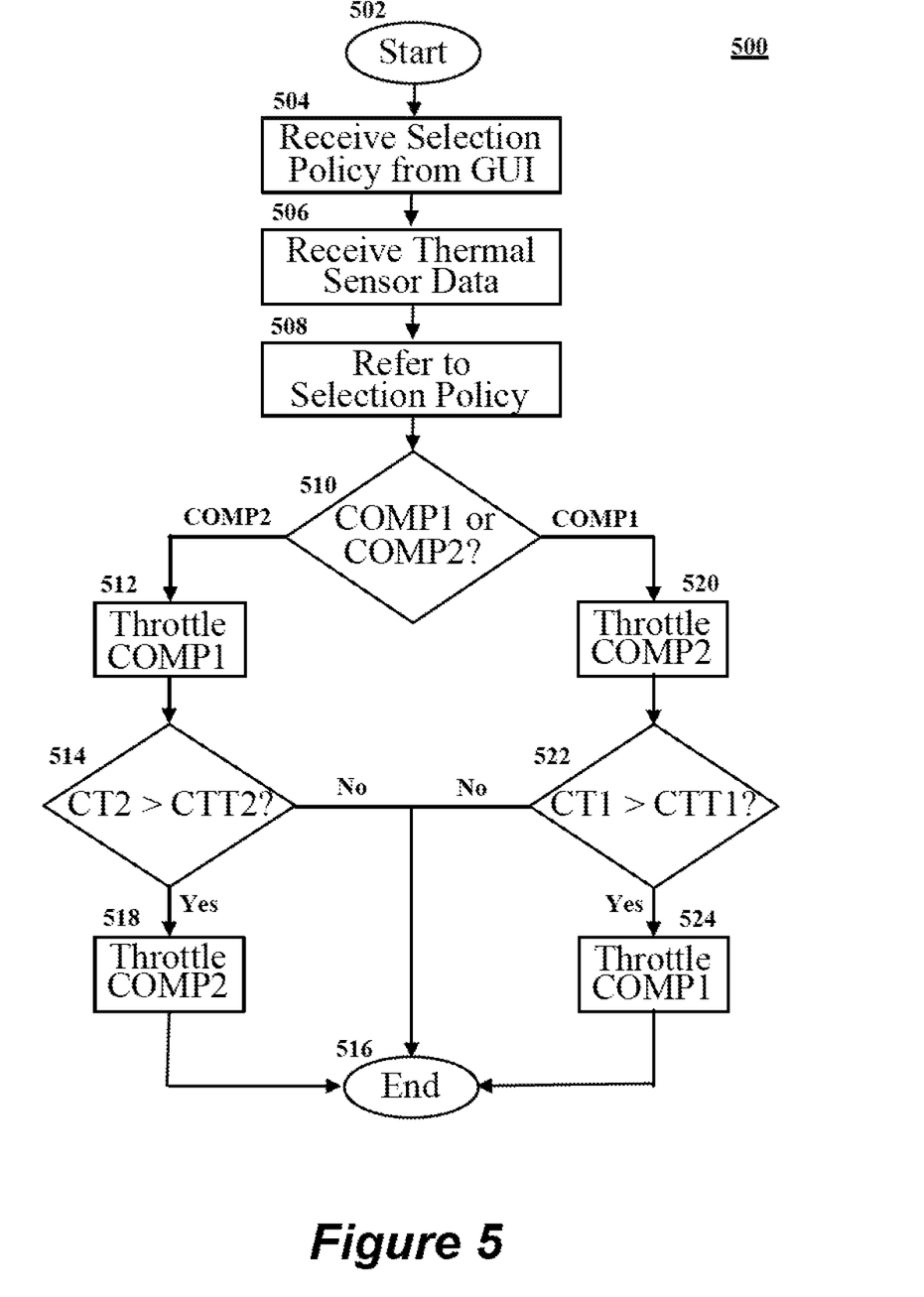
FIG. 5 illustrates in a flow chart one method for using a selection policy in throttling a component to reduce the temperature according to an embodiment of the present invention.

In a further embodiment, a selection policy may be used to designate which component is throttled. FIG. 5 illustrates in a flow chart one embodiment of a method 500 for using a selection policy in throttling a component to reduce the temperature. The selection policy may be devised in a number of ways. In one embodiment, the process starts (Block 502) when the computing system 100 receives a selection policy by a user through a graphical user interface (GUI) or other method (Block 504). The selection policy may also be already present in the system or received by some other method. The throttling arbiter of a first component (COMP1) registers a first component temperature (CT1) received from the thermal sensor exceeding a first threshold temperature for that component (CTT1) (Block 506). The throttling arbiter refers to the selection policy (Block 508). If the selection policy indicates COMP1 is the slave component and should be throttled (Block 510), then the throttling arbiter has the throttling hardware throttle COMP1 (Block 512). At the same time, a second component (COMP2) receives a second component temperature (CT2) from its thermal sensor. If CT2 is not greater than the second component threshold temperature (CTT2) at this point (Block 514), the process ends (Block 516). If CT2 is still greater than CTT2 (Block 514), then the throttling arbiter of COMP2 has the throttling hardware of COMP2 throttle COMP2 (Block 518), ending the process (Block 516). If the selection policy indicates COMP2 is the slave component and should be throttled (Block 510), then the throttling arbiter of COMP2 has the throttling hardware of COMP2 throttle COMP2 (Block 520). The throttling arbiters of COMP1 and COMP2 may communicate using the methods described in FIG. 3 and FIG. 4. If CT1 is not greater than CTT1 at this point (Block 522), the process ends (Block 516). If CT1 is still greater than CTT1 (Block 522), then the throttling arbiter of COMP1 has the throttling hardware of COMP1 throttle COMP1 (Block 524), ending the process (Block 516). The second throttling may be to a lesser degree than the first throttling.

Figure 6:
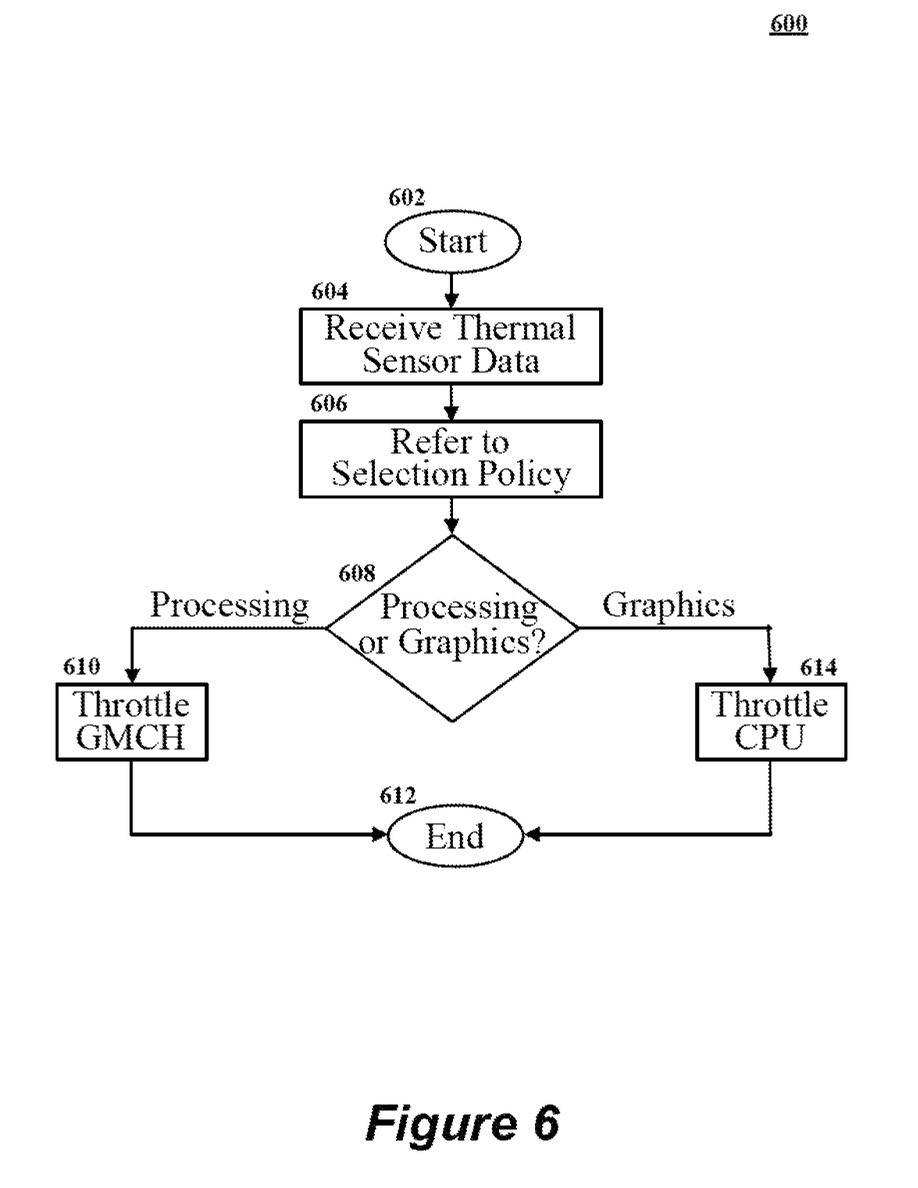
FIG. 6 illustrates in a flow chart one of a method for using an action-based selection policy according to an embodiment of the present invention.

In a further embodiment, a selection policy may be based on the actions being performed by the computing system at that time. FIG. 6 illustrates in a flow chart one embodiment of a method 600 for using an action-based selection policy. In one embodiment, the process starts (Block 602) when the throttling arbiter of COMP1 registers a temperature received from the thermal sensor exceeding CTT1 (Block 604). The throttling arbiter refers to the selection policy (Block 606). If a processing intensive action is being performed (Block 608), then the GMCH throttling arbiter 123 has the graphics throttling hardware 124 throttle the graphics engine 121 (Block 610), ending the process (Block 612). If a graphics intensive action is being performed (Block 608), then the CPU throttling arbiter 113 has the CPU throttling hardware 114 throttle the microprocessor 111 (Block 610), ending the process (Block 612).

In the above description, for purposes of explanation, numerous specific details are set forth in order to provide a thorough understanding of the present invention. It will be apparent, however, to one skilled in the art that the present invention can be practiced without these specific details.

What is claimed is:

1. A method, comprising:
    receiving a first temperature from a first integrated circuit device, the first temperature indicating the first integrated circuit device exceeds a first threshold temperature;
    applying a cooling policy for a second integrated circuit device, at a first time, in response to receiving the first temperature, wherein the second integrated circuit device has a direct thermal influence on the first integrated circuit device, and wherein a cooling policy for the first integrated circuit device is not applied at the first time;
    receiving a second temperature from the first integrated circuit device; and
    applying the cooling policy for the first integrated circuit device, at a time subsequent to the first time, in response to receiving the second temperature, the second temperature indicating the first integrated circuit device continues to exceed the first threshold temperature.

2. The method of claim 1, wherein applying the cooling policy further comprises applying passive cooling.

3. The method of claim 2, wherein the passive cooling comprises device throttling.

4. The method of claim 1, further comprising:
    the first integrated circuit device sending the second integrated circuit device a first signal in response to the first integrated circuit device exceeding the first threshold temperature.

5. The method of claim 4, further comprising:
    the second integrated circuit device sending the first integrated circuit device a second signal in response to the second integrated circuit device exceeding a second threshold temperature.

6. A non-transitory computer-readable recording medium having stored thereon instructions, which if executed by a machine causes the machine to perform a method comprising:
    receiving a first temperature from a first integrated circuit device, the first temperature indicating the first integrated circuit device exceeds a first threshold temperature;
    applying a cooling policy for a second integrated circuit device, at a first time, in response to receiving the first temperature, wherein the second integrated circuit device has a direct thermal influence on the first integrated circuit device, and wherein a cooling policy for the first integrated circuit device is not applied at the first time;
    receiving a second temperature from the first integrated circuit device; and
    applying the cooling policy for the first integrated circuit device, at a time subsequent to the first time, in response to receiving the second temperature, the second temperature indicating the first integrated circuit device continues to exceed the first threshold temperature.

7. The non-transitory computer-readable recording medium of claim 6, wherein applying the cooling policy further comprises applying passive cooling.

8. The non-transitory computer-readable recording medium of claim 7, wherein the passive cooling comprises device throttling.

9. The non-transitory computer-readable recording medium of claim 6, wherein the performed method further comprising:
    the first integrated circuit device sending the second integrated circuit device a first signal in response to the first integrated circuit device exceeding the first threshold temperature.

10. The non-transitory computer-readable recording medium of claim 9, wherein the performed method further comprising:
    the second integrated circuit device sending the first integrated circuit device a second signal in response to the second integrated circuit device exceeding a second threshold temperature.

* * * * *